R. S. TROTT.
VEHICLE SPRING SUSPENSION.
APPLICATION FILED AUG. 1, 1914.

1,218,819.

Patented Mar. 13, 1917.
2 SHEETS—SHEET 1.

Witnesses:
Watts F. Estabrook
Frank H. Borden

Inventor:
Rolland S. Trott
By Vernon E. Hodge
his Atty.

R. S. TROTT.
VEHICLE SPRING SUSPENSION.
APPLICATION FILED AUG. 1, 1914.
1,218,819.
Patented Mar. 13, 1917.
2 SHEETS—SHEET 2.
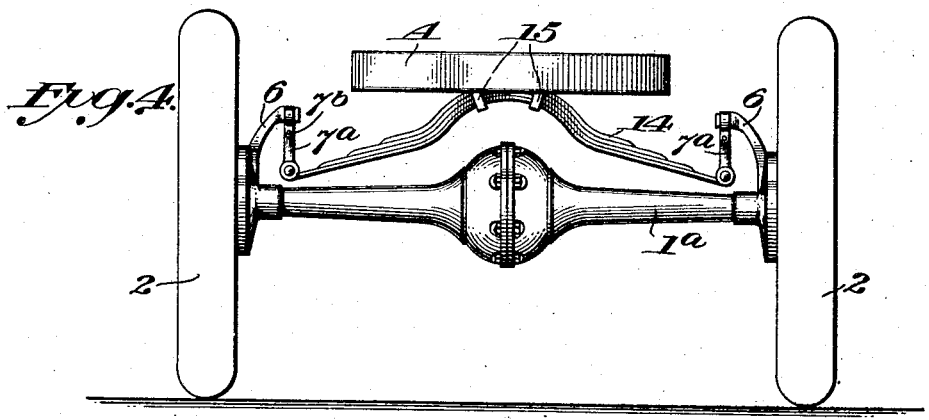
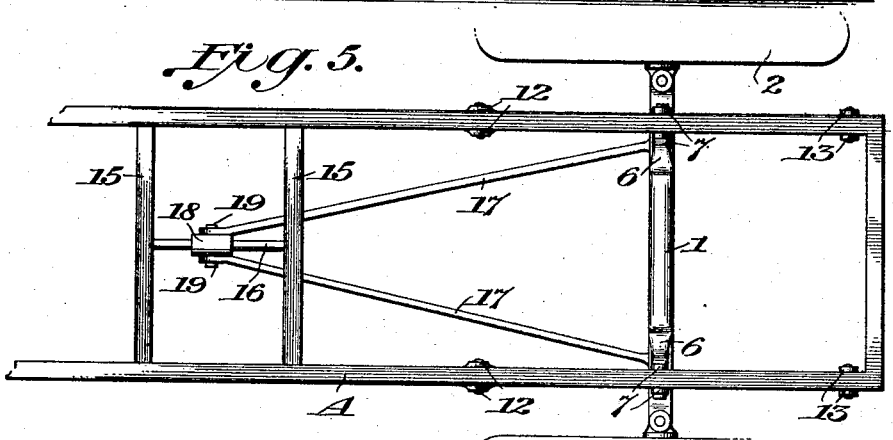
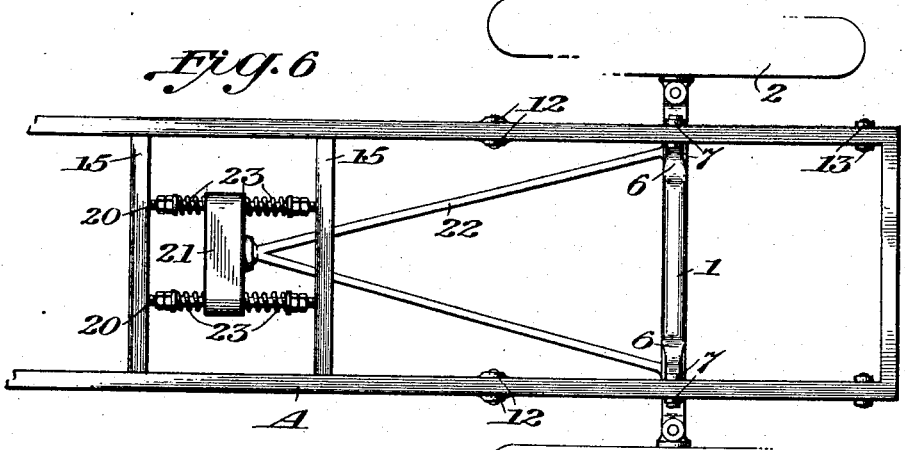

UNITED STATES PATENT OFFICE.

ROLLAND S. TROTT, OF DENVER, COLORADO.

VEHICLE SPRING SUSPENSION.

1,218,819.      Specification of Letters Patent.      Patented Mar. 13, 1917.

Application filed August 1, 1914. Serial No. 854,574.

*To all whom it may concern:*

Be it known that I, ROLLAND S. TROTT, a citizen of the United States, residing in the city and county of Denver and State of Colorado, have invented certain new and useful Improvements in Vehicle Spring Suspensions, of which the following is a specification.

My invention relates to an improvement in vehicle spring suspensions. This invention pertains more particularly to a suspension in which the axle is permitted to have movement in the direction of the longitudinal extent of the frame, and is a further development of the principle disclosed in U. S. Letters Patent Nos. 1,029,730; 1,029,731; and 1,029,732, granted to me on June 18, 1912.

With the suspensions as disclosed in the patents above referred to, the axle has been secured to the load-springs, and these load-springs have been mounted to have movement in the direction of the longitudinal extent of the frame.

It is an object of my present invention to so construct a spring suspension that the load-springs may be secured to the frame, and the axles so connected with the load-springs that they may have movement with respect thereto in the direction of the longitudinal extent of the frame, thus forming what is perhaps a more rigid structure than where the springs are mounted to move about their connection with the frame.

This invention relates to certain other novel features of construction and combinations of parts which will be hereinafter fully described and pointed out in the claims.

In the accompanying drawings:—

Figure 1:
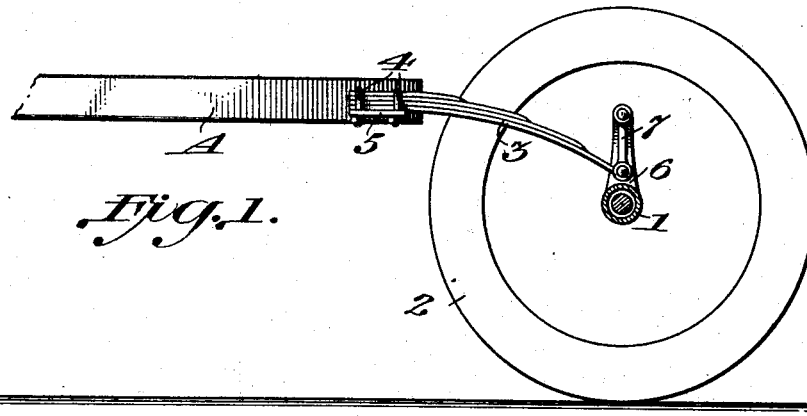
Figure 2:
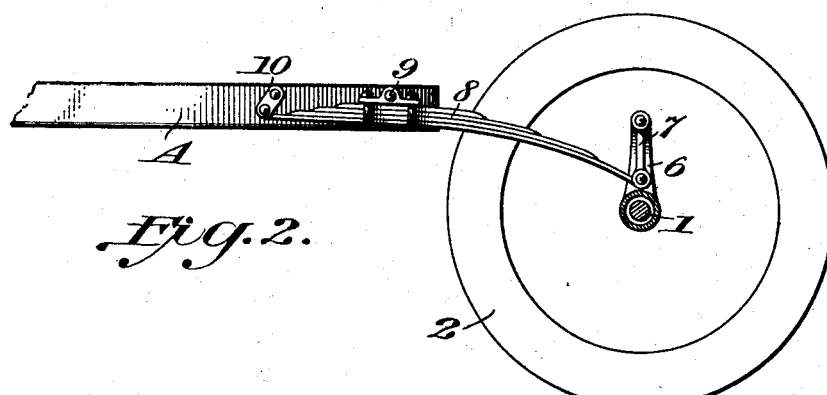
Figure 3:
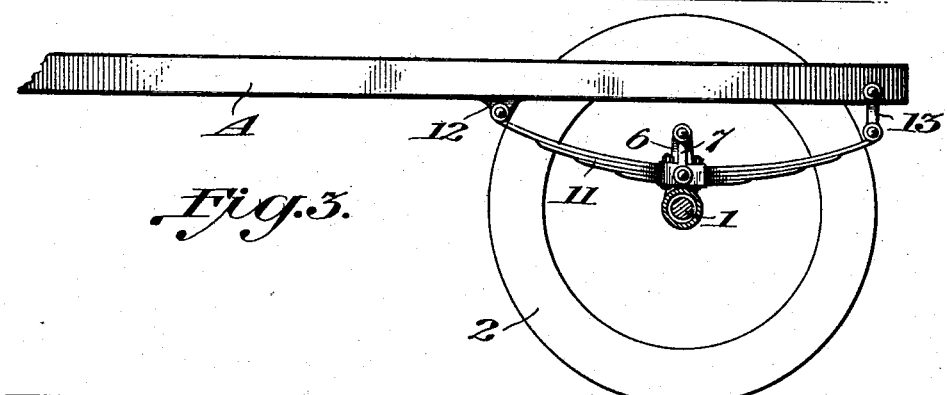

Figure 1 is a view of one end of a frame showing the adaptation of a leaf bow-spring, Fig. 2 is a similar view showing the cantaliver spring in use, Fig. 3 is another modification showing the adaptation of a semi-elliptic spring, Fig. 4 illustrates the suspension adapted to a single cross-axle load-spring, Fig. 5 discloses a reach structure to be used in holding the axle square with the frame, and Fig. 6 shows a modified form of reach structure.

In Fig. 1, the frame A has the wheel axle 1, on which the wheels 2 are mounted carried at a point beyond its end. Bow-leaf springs 3 are secured at their one end by clips 4 to brackets 5 on each side of the frame to have their free end extend to a point beyond the frame.

A bracket 6 is carried by the axle near each end thereof to extend upwardly. A link 7 is pivoted at its one end to each of the brackets 6, and leaf-springs 3 are each connected with the free end of one of the links 7.

In this structure when the wheels 2 strike an obstruction in the road, they are momentarily halted, and the frame A continues in its uninterrupted direction of travel. The links 7 wind around their pivotal connection with the brackets 6, and through the pivotal connection of the links and the springs 3 the frame is permitted to have this movement longitudinally with respect to the axle.

In Fig. 2, the parts are the same with the exception that in place of the springs 3, cantaliver springs 8 are used. These springs are pivoted in their body portion at 9 to the opposite sides of the frame, and the inner ends are connected by the links 10 with the frame. The outer ends of the spring 8 are pivotally connected with the links 7. This form of spring gives greater resilience than would the bow-spring secured rigidly as in Fig. 1.

In Fig. 3, the semi-elliptic springs 11 are pivotally connected at their one end to the brackets 12 carried by the frame, and the remaining ends of the springs are connected by the links 13 with the frame. The brackets 6 are provided as in Figs. 1 and 2, and the links 7 are connected at their one end with these brackets and pivotally connected at the opposite end to the body of the springs 11. In this form the operation is substantially the same as with the structures illustrated in Figs. 1 and 2, and the link connection at 13 between the spring and frame is not to permit movement of the spring with respect to the frame, but merely to permit free flexing of the spring.

In Fig. 4, the load-spring 14 is rigidly connected by clips 15 across the frame A. The brackets 6, 6, are carried near the ends of the axle, or as disclosed in this instance where the adaptation is to a rear axle, by the axle-housing 1ª. Links 7ª 7ª are pivotally connected with the brackets and with the spring 14, and in this connection it is preferable that a joint be provided in the links at 7ᵇ to allow for the extension of the load-spring as it is compressed.

In each of the forms disclosed in Figs. 1, 2, 3, and 4, it is essential that some means be provided to hold the axle at a position that the brackets 6 will always be on the upper side, and if this means be not provided, it is obvious that there will be a displacing of the parts.

In Fig. 5 I have shown in top plan a frame with one form of reach, which will accomplish the desired result. In this instance, the load-springs are (as illustrated in Fig. 3) mounted at each side of the frame. Cross-bars 15, 15, are secured between the side members of the frame A, and a guide-rod 15 is connected to these cross-bars to extend in a direction parallel with the side members of the frame, and to be approximately midway between them. Reach members 17, 17, are secured near the ends of the axle 1. A bearing-block 18 is slidably mounted on the rod 16, and the reach members 17 are connected pivotally at 19 with this bearing-block, thus forming a substantial V-shaped brace. As the links 7 are in each instance mounted between the axle and load-spring in suspension, they will have a tendency to maintain the pivotal connection with the spring and with the bracket in substantially vertical alinement, and, when the parts have been moved from this position, will act to restore them. In this connection, the reach structure acts only to hold the axle against turning, and to maintain it in a position at right-angles to the extent of the frame.

In Fig. 6, two bearing-rods 20, 20, are mounted between the cross-members 15, 15 of the frame. A cross-head 21 is mounted to slide on these rods 20. A V-shaped brace 22 is connected near its ends to the ends of the axle, and at its angle has a pivotal connection with the cross-head 21.

Springs 23, 23, are mounted on the rods 20 on each side of the cross-head 21 to hold this cross-head normally centered on the rods. In this form the movement of the axle with respect to its connection to the load-springs is resiliently opposed by the springs 23, and after the obstruction has been passed the links will be aided in their restoration by these springs.

From the foregoing it will be seen that I have provided a structure in which the standard forms of spring attached at a fixed point on the frame may be used, and the desired movement of the axle accomplished by only a slight alteration in the structure of the axle.

I claim:

1. The combination with a vehicle frame, and a therewith associated wheel axle, of a load-spring connected with the frame, a link mounted in suspension between the spring and axle to permit movement of the axle in the direction of the longitudinal extent of the frame, and means acting to resiliently oppose said movement and to restore the parts to their normal position.

2. The combination with a vehicle frame and a therewith associated wheel axle, of a load-spring connected with the frame, a connection between the spring and axle designed to permit movement of the axle in the direction of the longitudinal extent of the frame, and means acting to resiliently oppose said movement and to restore the axle to its normal position.

3. The combination with a vehicle frame and a therewith associated wheel axle, of a load-spring connected with the frame, a connection between the axle and spring designed to permit movement of the axle in the direction of the longitudinal extent of the frame, means to resiliently oppose said movement of the axle, and means to hold the axle against twisting or side movement.

4. The combination with a vehicle frame and a therewith associated wheel axle, of a load spring connected with the frame, links connected between the axle and the load-spring to permit movement of the axle circularly about the point of connection with the spring, means to prevent twisting or side movement of the axle, and the links so mounted as to act to resiliently oppose said circular movement of the axle, and to restore the axle to its normal position.

5. The combination with a vehicle frame and a therewith associated wheel axle, of a load-spring connected with the frame, links connected between the axle and spring to permit movement of the axle in the direction of the longitudinal extent of the frame, a reach secured to the axle and connected with the frame to prevent twisting of the axle and to accommodate said movement longitudinally with respect to the frame, and the links so mounted that they act to resiliently oppose said longitudinal movement and to restore the parts to their normal position.

6. The combination with a vehicle frame and a therewith associated wheel axle, of a load-spring connected with the frame, links connected between the axle and spring to permit movement of the axle in the direction of the longitudinal extent of the frame, a reach secured to the axle and connected with the frame to prevent twisting of the axle and to accommodate said movement longitudinally with respect to the frame, and means to resiliently oppose the movement of the reach and axle and to restore these parts to their normal position.

In testimony whereof I affix my signature, in the presence of two witnesses.

ROLLAND S. TROTT.

Witnesses:
 WM. TAIT,
 IRENE M. VARRAN.

Copies of this patent may be obtained for five cents each, by addressing the "Commissioner of Patents, Washington, D. C."